United States Patent Office 2,751,304
Patented June 19, 1956

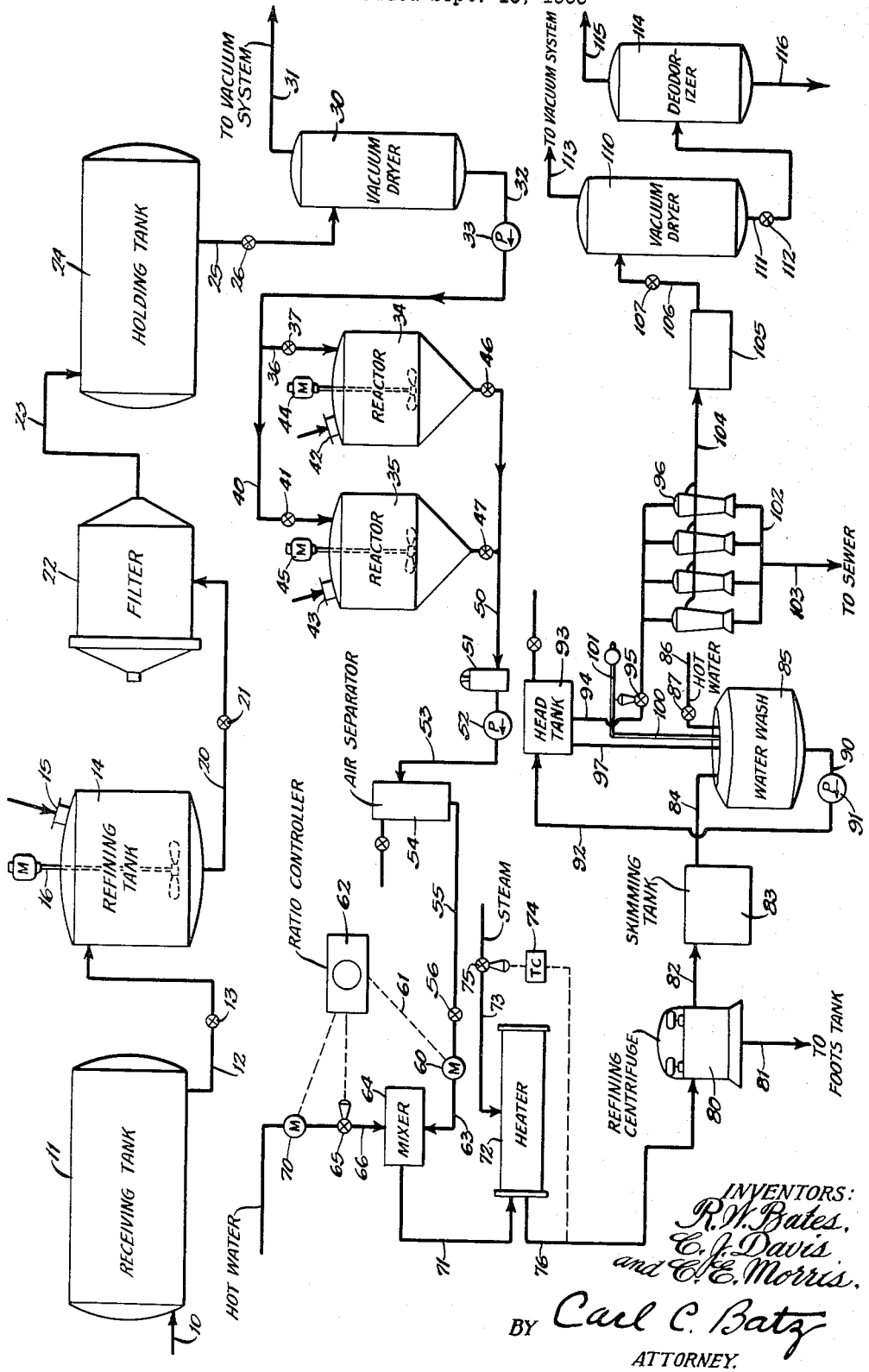

2,751,304

PROCESS FOR THE PRODUCTION OF MOLECULARLY MODIFIED LARD

Robert W. Bates, Charles J. Davis, Jr., and Charles E. Morris, Chicago, Ill., assignors, by mesne assignments, to Swift & Company, a corporation of Illinois Application September 15, 1953, Serial No. 380,289

6 Claims. (Cl. 99—118)

This invention relates to an improved process for the production of molecularly modified lard. In one of its aspects, this invention relates to an improved process for the removal of spent catalyst and undesirable side products from the modified lard product.

It is well known that lard has unsurpassed shortening properties but that the hydrogenated vegetable shortenings are generally considered as having superior creaming and emulsifying properties as well as improved appearance and storing properties. The inferiority of lard in the aforementioned properties is attributable to the normal crystallization habit of lard. Upon solidification the lard glyceride molecules form into long needle-like crystals which continue to grow during storage. These crystals impart to the lard a waxy, rubber-like texture or graininess which becomes more pronounced and highly objectionable on standing, especially at the comparatively high temperatures generally encountered in distribution through normal commercial channels.

However, there has recently been developed a process wherein the lard glyceride molecule is rearranged so as to provide the lard with a crystallization habit similar to that of the hydrogenated vegetable shortenings. See, for example, Reissue Patent No. 23,499, to Vander Wal and Van Akkeren, and U. S. Patents 2,625,478 through 2,625,486 to various other inventors. This process is extremely significant in that it permits lard, which commercially is the most important glyceride material from an animal source, to compete on favorable terms with the hydrogenated vegetable shortenings in a market heretofore unfeasible.

One of the principal problems in the production of an edible food product is the removal of inedible material and substances which are poisonous on human consumption. This problem is especially present in the production of molecularly modified lard since the natural lard material is treated with a catalyst which must be removed along with undesirable side products which are formed during the molecular modification. When alkaline reacting catalysts, such as the metal alcoholates, are employed in the modification reaction, generally not all the catalyst is used and remains in admixture with the lard from which it must be separated before the product can be put on the market for human consumption. There are also formed during the modification reaction undesirable side products, the most common being soaps formed by the reaction between the alkaline catalyst and some of the free fatty acid which is naturally present in the lard.

In a batch-type reaction the normal method for killing the catalyst and hydrating the soap is to add a quantity of water to the reaction vessel after the modification is complete and mixing for a period of time to kill the catalyst and hydrate the soap. The mixture is then allowed to settle into a lard phase and an aqueous phase, the latter being drawn off from the bottom of the kettle. One of the principal disadvantages of this method is that the mixing is usually inadequate and the contact by the water with the spent catalyst and soap is not as good as it should be. If the mixing is more severe, a longer time is necessary for the phases to separate, thus requiring a longer holding period.

According to the present invention, we have devised a method for purifying the modified lard which is continuous in nature and which can be adapted to either a batch type or a continuous type of modification process. By our process the mixture of modified lard, spent catalyst, and undesirable side products is continuously passed to a mixing zone where it is automatically mixed with a predetermined quantity of hot water and thoroughly agitated in a vigorous manner. In this manner, the contact of the water with the spent catalyst and soap is much more complete and a better efficiency is obtained. However, as is known, soap is an excellent emulsifying agent and there is produced by this mixing an emulsion which improves the contacting of water with the catalyst and soap. This emulsion is broken by passing same to a heating zone where the temperature is raised to about 160 to 180° F. The thus-broken emulsion is then passed to a separating zone where the aqueous phase, containing the spent catalyst and hydrated soap, is removed from the modified lard.

It is, therefore, an object of this invention to provide an improved process for the molecular modification of lard.

A further object of this invention is to provide an improved process for the removal of spent catalyst and undesirable side products from modified lard.

Further and additional objects of this invention will become apparent to those skilled in the art by reading the accompanying disclosure and specification.

The drawing is a schematic presentation of a preferred modification of our invention.

Referring now in detail to the drawing, ordinary unrefined lard from the tank house is pumped through line 10 into receiving tank 11 where it is held for a period before passing, in the liquid phase, through line 12 and valve 13 into refining tank 14. In the refining tank a quantity of a diatomaceous earth material, approximately 1%, and a small quantity of charcoal, about 0.1%, are added through opening 15 in refining tank 14, and the mixture agitated by means of motor-driven stirrer 16 for a period of about 30 to 60 minutes, at a temperature in the range of 180 to 200° F. At the end of this period the mixture is passed through line 20 and valve 21 into pressure filter 22 where the solid materials containing occluded impurities are removed. The refined lard is passed via line 23 into holding tank 24 where it is held in liquid phase until it is ready for use.

In the modification reaction it is necessary that the lard be dry so that the catalyst will not be affected by water and a larger quantity required. To accomplish this, lard from holding tank 24 is passed through line 25 and valve 26 into a vacuum drier 30 where the lower boiling water is removed via line 31. The lard leaving vacuum drier 30 through line 32 and pump 33 contains as a maximum 0.04 weight per cent water. It has been our experience that at water concentrations higher than 0.04 weight per cent a quantity of catalyst three times larger than usual is required. Lard coming from drier 30 through pump 33 can be passed to either of reactors 34 or 35 through line 36 and valve 37 or line 40 and valve 41 respectively. By this arrangement of the equipment, a reaction can be carried out in one reactor while the other is being emptied of reaction mixture. The modification reaction can be carried out in the conventional manner as disclosed in the aforementioned patents. Our preferred catalyst, sodium methoxide, is added as a solid to reactors 34 or 35 through openings 42 or 43, respectively, in a quantity of about 0.5 to 1% by weight of the lard. It will be appreciated that other alkaline reacting interesterification catalysts can be employed. The reaction mixture is kept in the liquid phase at a temperature in the range of 120 to 200° F. for a period of about 2 to 60 minutes, and is agitated by means of motor-driven stirrers 44 or 45.

It will be appreciated that the modification reaction can be carried out in a batch type of operation, as illustrated, or in a continuous manner, by providing a reactor of suitable dimensions and adjusting the continuous addition of catalyst and dried lard and adjusting the residence time of the reaction mixture within the reactor.

After the reaction is complete, the reaction mixture leaves vessels 34 or 35 through valves 46 or 47 and passes through line 50 and strainer 51 to pump 52 where it is pumped through line 53 to an air separator 54 and air entrained in the reaction mixture in reactors 34 or 35 is removed. The de-aired reaction mixture passes continuously from air separator 54 through line 55 and valve 56, which can be used to control the rate of flow. The reaction mixture is metered by a rotometer 60 which is connected by means of electrical lead 61 to a ratio controller 62, as it passes through line 63 to a high-speed mixer 64. In response to the amount of reaction mixture passing through rotometer 60, ratio controller 62 can be set to automatically control motor valve 65 to regulate the quantity of hot water passing through line 66 into mixer 64. In practice, we prefer to use a quantity of about 5 weight per cent of water based on the weight of reaction mixture. The hot water, which is at a temperature of about 140 to 150° F., passes through a rotometer 70, which is also connected with ratio controller 62, before entering motor valve 65 at line 66.

In mixer 64 the water and reaction mixture are vigorously agitated and intimate contacting of the water and catalyst and soap is effected. The emulsion formed in mixer 64 passes through line 71 into a heating zone 72 where the emulsion is broken. The emulsion is held in heating zone 72 for a period of about 1 to 2 minutes at a temperature in the range between 160 and 180° F. This high temperature, besides serving to break the emulsion, also increases the rate of reaction between the water and the spent catalyst and hydration of the soap, thus serving the dual function of breaking the emulsion and improving the separation of impurities. In heating zone 72 the temperature is regulated by the controlled admission of steam through line 73 into the outer recesses of heating zone 72 by means of a temperature controller 74 and motor valve 75. The temperature of the emulsion leaving the heating zone through line 76 is continuously measured by means of a thermocouple in the line connected with temperature controller 74.

The broken emulsion passes to a refining centrifuge 80 where the solid foots and spent catalyst contained in the aqueous phase are removed through line 81. The lard phase is passed via line 82 to a skimming tank 83 from whence it passes through line 84 to washing tank 85. Actually, skimming tank 83 can be bypassed if desired. The principal purpose of the skimming tank is to be able to remove some of the scum which may fail to be taken off with the aqueous phase, and serves more as a check on the operation of refining centrifuge 80. In washing tank 85 the lard is mixed with a quantity of hot water, generally about 10 weight per cent based on the weight of lard, admitted through line 86 and valve 87. The temperature of the wash water is approximately 150° F. The water-lard mixture leaves wash tank 85 through line 90 and is pumped by means of pump 91 through line 92 into a head tank 93. Part of the water-lard mixture is passed via line 94 through mechanically-controlled valve 95 into a bank of centrifuges 96. The remaining part of the water-lard mixture is passed downwardly through line 97 back to wash tank 85, thus effecting a continuous circulation of the water-lard mixture. The approximate washing period of the lard is about 5 minutes. The amount of lard-water mixture leaving through line 94 is equated on a volume basis to the amount of lard and hot water being continuously added by means of a float in wash tank 85, not shown, which is attached by means of arms 100 and 101 to valve 95.

The purpose of this wash step is to clean the lard of any residual catalyst or soap which may not have been removed in the refining centrifuge 80. The aqueous phase from the washing operation is removed from the bank of centrifuges via manifold 102 and line 103 to sewer. The purified lard is passed via line 104 to feed tank 105 from whence it passes through line 106 and valve 107 to vacuum drier 110. The finished lard leaving through line 111 and valve 112 has a water content of about 0.05 weight per cent or less. The water vapor is passed via line 113 to a condenser, not shown, from where it is removed from the system.

The dried modified lard is then passed to deodorizer 114 where it is given a deodorization treatment to remove odoriferous materials, such as the methyl esters formed during the modification reaction and catalyst removal operation. The odoriferous materials are removed from deodorizer 114 via line 115. The deodorized modified lard is recovered through line 116. If desired the modified lard can then be blended with unmodified lard, as disclosed in the co-pending application of Vander Wal, Buswell and Van Akkeren, Serial No. 299,062, filed July 16, 1952, and/or vegetable or lard flakes.

It will be readily appreciated by those skilled in the art that many modifications may be made without departing from the spirit or scope of our invention as defined in the appended claims.

We claim:

1. In a process for the molecular modification of lard by treatment in the liquid phase with an alkaline reacting interesterification catalyst, the steps which comprise continuously passing reaction mixture containing spent catalyst and undesirable side products to a mixing zone; therein automatically adding a pre-determined quantity of hot water and vigorously agitating the same to concomitantly kill the catalyst, hydrate undesirable side products, and form an emulsion; continuously passing said emulsion to a heating zone and therein heating said emulsion to a temperature in the range of 160 to 180° F. for a period sufficient to break said emulsion; and subsequently separating the aqueous phase containing undesirable side products and spent catalyst from the organic phase containing modified lard.

2. In a process for the molecular modification of lard by treatment in the liquid phase with a metal alcoholate modification catalyst, the steps which comprise continuously passing reaction mixture containing spent metal alcoholate catalyst and undesirable side products to a mixing zone; therein automatically adding a pre-determined quantity of hot water and vigorously agitating same to concomitantly kill the metal alcoholate catalyst, hydrate the undesirable side products, and form an emulsion; continuously passing said emulsion to a heating zone and therein heating said emulsion to a temperature in the range of 160 to 180° F. for a period of from 1 to 2 minutes to break said emulsion; and subsequently separating the aqueous phase containing undesirable side products and spent alcoholate catalyst from the organic phase containing the modified lard.

3. In a process for the molecular modification of lard by treatment in the liquid phase with sodium methoxide, the steps which comprise continuously passing reaction mixture containing spent sodium methoxide catalyst and undesirable side products to a mixing zone; therein automatically mixing same with about 5 weight per cent hot water, based on the weight of reaction mixture, to concomitantly destroy the sodium methoxide catalyst, hydrate the undesirable soaps formed, and form an emulsion; continuously passing said emulsion to a heating zone and therein heating said emulsion to a temperature of about 180° F. for a period of about 1 minute to break said emulsion; and subsequently separating the aqueous phase containing hydrated soaps and deactivated sodium methoxide catalyst from the organic phase containing the modified lard.

4. A process for the molecular modification of lard which comprises, refining lard in the liquid phase by treatment with a small quantity of charcoal and a diatomaceous earth material; filtering the mixture to remove solids containing occluded impurities; drying the lard to a water content below about 0.04 weight per cent; passing the dried lard in the liquid phase to a reaction zone and therein molecularly modifying same by treatment with an alkaline reacting interesterification catalyst under modifying conditions; continuously passing the reaction mixture to a mixing zone and therein automatically adding a pre-determined quantity of hot water and vigorously agitating same to concomitantly kill the catalyst, hydrate undesirable side products, and form an emulsion; continuously passing said emulsion to a heating zone and therein heating same to a temperature in the range of 160 to 180° F. for a period sufficient to break said emulsion; passing the resulting mixture to a first separating zone and therein separating the aqueous phase containing spent catalyst and hydrated side products from the lard phase containing modified lard; passing the lard phase to a washing zone and therein washing same with a small amount of hot water; separating the water phase from the lard phase; and drying the lard phase.

5. A process for the molecular modification of lard which comprises, refining lard in the liquid phase by treatment with a small quantity of charcoal and a diatomaceous earth material; separating the solids containing occluded impurities from the lard; drying the refined lard to a water content below 0.04 weight per cent; passing the dried refined lard in liquid phase to a reaction zone and therein molecularly modifying same by treatment with a metal alcoholate catalyst under modifying conditions; passing the reaction mixture to a mixing zone and therein automatically adding a pre-determined quantity of hot water and vigorously agitating same to concomitantly kill the metal alcoholate catalyst; hydrate the undesirable side products, and form an emulsion; passing said emulsion to a heating zone and therein heating same to a temperature in the range of about 160 to 180° F. for a period of about 1 to 2 minutes to break said emulsion; passing the thus-broken emulsion to a first separating zone and therein separating the aqueous phase containing spent metal alcoholate catalyst and hydrated undesirable reaction product from the organic phase containing the modified lard; passing said organic phase to a second separating zone and therein removing contaminating solids; passing the organic phase to a washing zone and therein washing same with about 10 weight per cent of hot water; separating the water from the organic phase; and drying the organic phase.

6. A process for the molecular modification of lard which comprises, refining lard in the liquid phase by treatment with about 1% by weight of a diatomaceous earth material and about 0.1% of charcoal for a period of about 30 to 60 minutes at a temperature of about 180 to 200° F.; thereafter removing the solids containing occluded impurities; drying the refined lard to a water content below 0.04 weight per cent; passing the dried refined lard in the liquid phase to a reaction zone and therein molecularly modifying same by treatment with about 0.5 weight per cent of sodium methoxide at a temperature in the range of 120 to 200° F., for a period of about 2 to 60 minutes; passing the reaction mixture to a mixing zone and therein automatically adding about 5 weight per cent of hot water to concomitantly kill the sodium methoxide, hydrate the undesirable soap formed, and form an emulsion; passing said emulsion to a heating zone and therein heating same to a temperature of about 180° F. for a period of about 1 minute to break said emulsion; passing the thus-broken emulsion to a first separating zone and therein separating the aqueous phase containing spent sodium methoxide catalyst and hydrated soap, or foots, from the organic phase containing the modified lard; passing the organic phase to a second separating zone and therein removing contaminating solids; passing the organic phase to a washing zone and therein washing same with about 10 weight per cent of hot water for a period of about 5 minutes; separating the water from the organic phase; and drying the organic phase.

References Cited in the file of this patent
UNITED STATES PATENTS

| Re. 23,499 | Vander Val | May 20, 1952 |
| 2,625,483 | Mattil | Jan. 13, 1953 |